United States Patent [19]

Kashima et al.

[11] 4,280,136

[45] Jul. 21, 1981

[54] TAPE CASSETTE AND LABEL INSPECTION SYSTEM THEREFOR

[75] Inventors: Tsunehiro Kashima, Tokyo; Shunsuke Sakoda, Yokohama; Hidetoshi Tsuda, Sendai; Tamihei Hiramatsu, Chigasaki; Kazuyuki Morita, Ebina, all of Japan

[73] Assignee: Sony Corporation, Tokyo, Japan

[21] Appl. No.: 83,859

[22] Filed: Oct. 11, 1979

[30] Foreign Application Priority Data

Oct. 13, 1978 [JP] Japan ............................ 53-126531

[51] Int. Cl.³ .................... G11B 23/04; H04N 7/18
[52] U.S. Cl. .................................... 358/93; 360/132
[58] Field of Search .................... 360/132; 156/363; 358/101, 102, 93, 106; 353/25

[56] References Cited

U.S. PATENT DOCUMENTS

| | | | |
|---|---|---|---|
| 3,350,025 | 10/1967 | Lear | 360/132 |
| 3,918,094 | 11/1975 | Rudo | 360/132 |
| 3,943,879 | 3/1976 | Stone, Jr. et al. | 360/132 |

Primary Examiner—Joseph A. Orsino, Jr.
Attorney, Agent, or Firm—Lewis H. Eslinger; Alvin Sinderbrand

[57] ABSTRACT

Markings on a tape cassette label and on its tape leader cooperate with an inspection system which senses the markings to automatically compare the actual characteristics of the tape marked on the tape leader such as, for example, length and type of magnetic powder, with the characteristics described on the cassette label. In the event that the tape type and label description disagree, an alarm or removing mechanism may be automatically actuated to remove the mislabelled cassette.

16 Claims, 5 Drawing Figures

TAPE CASSETTE AND LABEL INSPECTION SYSTEM THEREFOR

BACKGROUND OF THE INVENTION

The present invention relates generally to a tape cassette label inspection system for use in tape cassette manufacturing and is directed more particularly to a tape cassette and label inspection system therefor which cooperates with sensible markings on a tape leader and a tape cassette label to ensure that the tape loaded in the tape cassette agrees with the description on the label.

Several kinds of magnetic tape may be loaded in a tape cassette, such as, for example, ferrite tape and chromium tape, depending upon the magnetic powder used therein. A magnetic tape may have a running time of, for example, 30 minutes, 60 minutes, 90 minutes or 120 minutes, depending upon the length of the tape and a predetermined tape transport speed.

The user purchases a tape cassette by observing the description thereof on the label on the exterior of the tape cassette. It is thus necessary to ensure that the label description agrees with the kind of tape therein before the cassette is placed on the market.

Such inspection of tapes and labels has been done one at a time by a human observer who carefully compares a tape with its label. Such inspection is slow and requires excessive skill on the part of the human observer.

OBJECTS AND SUMMARY OF THE INVENTION

Accordingly, it is an object of the present invention to provide a tape cassette label inspection system for use in tape cassette manufacturing which automatically determines whether a tape cassette label accurately describes the tape loaded therein.

It is another object of the present invention to provide a simple tape cassette label inspection system for use in tape cassette manufacturing wherein the kind of tape loaded in a tape cassette can be automatically and correctly determined.

A further object of the invention is to provide a tape cassette label inspection system for use in tape cassette manufacturing which can automatically determine that tape loaded therein agrees with the description on the label thereon.

It is a still further object of the invention to provide a tape cassette having means on its label which can be automatically read to permit automatic comparison of the type of tape loaded therein with the label description thereon.

According to an aspect of the invention, there is provided a tape cassette having a magnetic tape loaded therein and having a label on the outer surface of the tape cassette, comprising first sensible means on the label for indicating at least one characteristic of magnetic tape, second sensible means on the magnetic tape for indicating at least such characteristic, with at least that one characteristic on the label and the magnetic tape being in agreement for a properly labelled tape cassette.

According to a feature of the invention, there is provided a tape cassette label inspection system for use with a tape cassette having a label and a magnetic tape loaded therein and sensible markings on the label and on the magnetic tape indicating at least one characteristic of the magnetic tape, comprising first means for sensing the sensible markings on the magnetic tape and for producing a first signal in dependence thereon, second means for sensing the sensible markings on said label and for producing a second signal in dependence thereon, and means for comparing the first and second signals to determine whether agreement exists between the sensible markings on the label and on the magnetic tape.

The above, and other objects, features and advantages of the present invention, will become apparent from the following description read in cojunction with the accompanying drawings in which like reference numerals designate the same elements.

DETAILED DESCRIPTION OF THE PREFERRED EMBODIMENT

Figure 1:
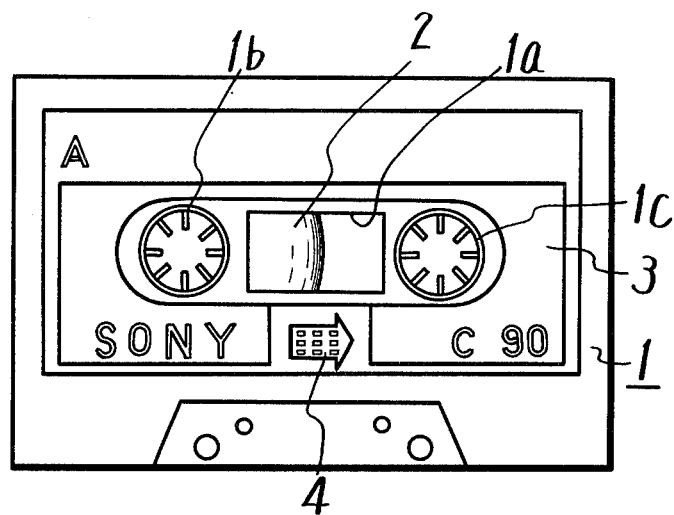
FIG. 1 is a top plan view of a tape cassette according to the present invention.
Figure 2:
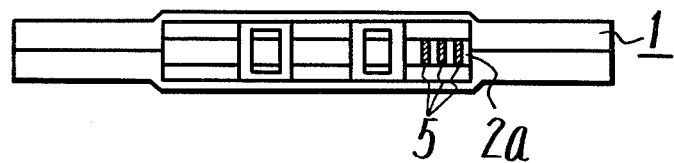
FIG. 2 is a front elevation view of the tape cassette shown in FIG. 1.

Referring now to FIGS. 1 and 2, a tape cassette 1 is there shown to have a magnetic tape 2 loaded on a supply reel 1b. A conventional take-up reel 1c is also included in the housing of tape cassette 1. A transparent window 1a in each of the top and bottom walls of the housing of tape cassette 1 permits observation of magnetic tape 2 and is also used to determine orientation of tape cassette 1 as will be explained hereinafter.

Figure 3:
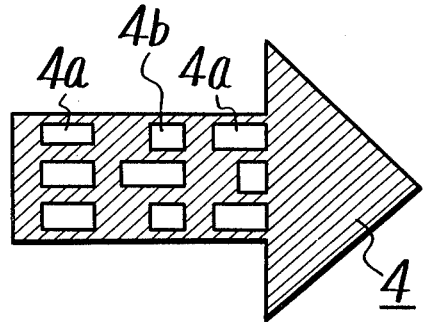
FIG. 3 is a close-up view of part of a label on the tape cassette shown in FIG. 1.

A descriptive label 3 is printed or otherwise affixed preferably to each of the top and bottom walls of tape cassette 1 to inform the buyer or user of such things as tape type, tape length (or running time), the name of the maker, etc. Each label may also identify a different recording/reproducing surface or track such as, for example, an A-surface and a B-surface. As shown on label 3 in FIG. 1, when the A-surface faces the observer, supply reel 1b is located to the left of the center of tape cassette 1. If the B-surface were visible, supply reel 1b would be located to the right of the center of tape cassette 1. A coded portion 4 of label 3, suitably located in the lower center of label 3 when the latter faces the observer, includes sensible digitally coded markings or bars 4a, 4b (FIG. 3) thereon. Coded portion 4 is conveniently arrow shaped in order to indicate the forward direction of tape transport for the respective A- or B-surface. Although any suitable coding method may be used, for definiteness in the present description, coded portion 4 includes long bars 4a to indicate binary "1" and short bars 4b to indicate binary "0". In order to reduce false detection due to noise, bars 4a and 4b are light or white against a darker background thus permitting detection of the integrated area thereof.

As best seen in FIG. 2, a tape leader 2a of magnetic tape 2 has sensible digitally coded bars 5 printed or otherwise marked thereon. Coded bars 5 contain the same information as to tape type and length as do coded bars 4a and 4b on label 3. Any convenient type of digital coding may be used in coded bars 5, but in the preferred embodiment, coded bars 5 use the same type of coding as used in coded arrow 4, i.e., mark length coding.

Figure 5:
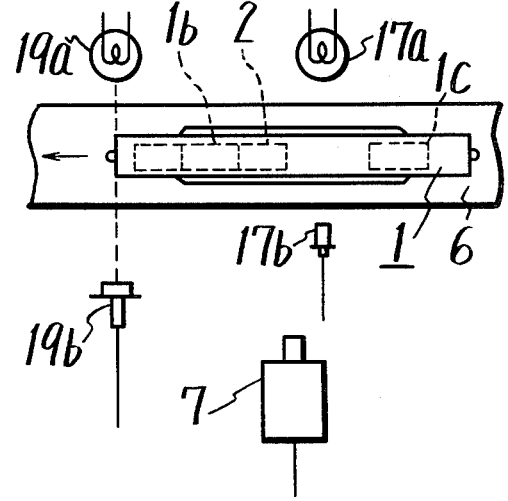
FIG. 5 is an enlarged detail view showing the arrangement of some of the sensors of FIG. 4.
Figure 4:
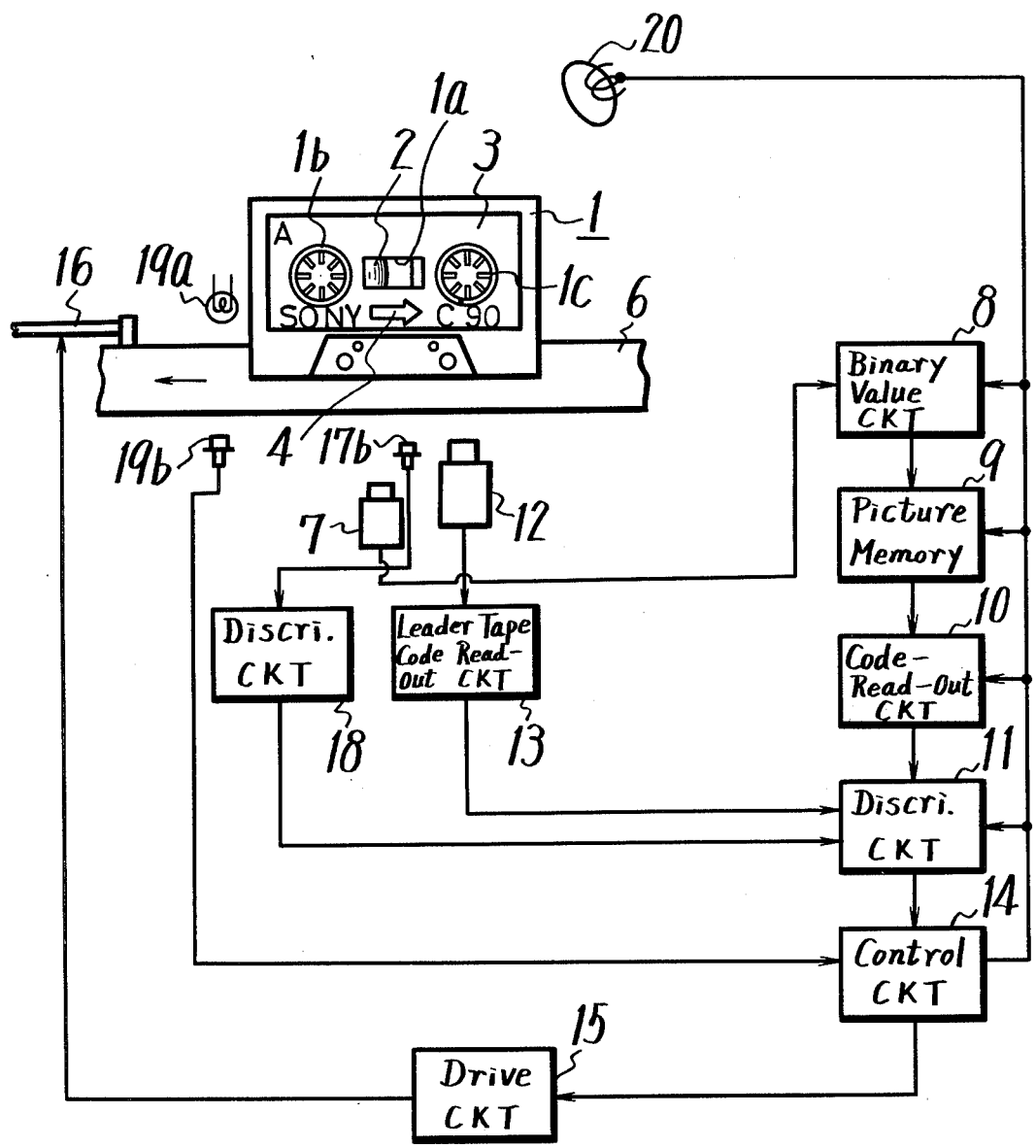
FIG. 4 is a schematic and block diagram showing a tape cassette label inspection system according to an embodiment of the present invention.

Referring now to FIGS. 4 and 5, there is shown an embodiment of a tape cassette label inspection apparatus or system which is capable of determining agreement between information on a label 3 and the tape in tape cassette 1. In addition, the apparatus is capable of determining whether the orientation of tape cassette 1 agrees with the orientation information on label 3 (A-surface or B-surface showing).

A conveyor belt 6, which is preferably made of transparent material, transports tape cassette 1 in the direction indicated by an arrow thereon. Tape cassette 1 may stand upright on conveyor belt 6 with its magnetic head access openings or windows (see FIG. 2) resting on the surface of conveyor belt 6. A first optical sensor 7, which may conveniently be a television camera, senses the information on coded portion 4 and a second optical sensor 12, which may also be a television camera, senses the information in coded bars 5 on tape leader 2a through transparent conveyor belt 6. Sensing by television cameras 7 and 12 is synchronized with the illumination of a lamp 20, which is preferably a high intensity flash or strobe lamp, as will be explained.

The output signal from television camera 7, containing the information in coded bars 4a and 4b, is applied to a binary value circuit 8 which converts the analog television signal into the digital values coded on coded bars 4a and 4b. Binary value circuit 8 transfers this digital data to a picture memory 9 which stores the binary information. At the proper time, the signal stored in picture memory 9 is applied to a code-read-out circuit 10 whereby the digital information stored in picture memory 9 is applied to a discrimination circuit 11.

Television camera 112 similarly provides an output signal corresponding to coded bars 5 on tape leader 2a and applies this signal to tape leader code read-out circuit 13. Tape leader code read-out circuit 13 may also contain circuits corresponding to binary value circuit 8, picture memory 9 and code-read-out circuit 10 to apply a digital signal to discriminator circuit 11 at the proper time corresponding to the receipt of digital signal from code-read-out circuit 10.

An inspection device may consist of a light source 17a (FIG. 5) and a photo-electric conversion device 17b, such as a phototransistor, which are arranged spaced apart on opposite sides of conveyor belt 6 for the passage of tape cassette 1 therebetween. When tape cassette 1 is in a predetermined position, the light from light source 17a reaches phototransistor 17b is blocked therefrom in dependence on whether supply reel 1b is leading or lagging take-up reel 1c with respect to the direction of motion of conveyor belt 6. As best seen in FIG. 5, when supply reel 1b is leading, light from light source 17a passes through transparent window 1a on each side of tape cassette 1 and impinges on phototransistor 17b. If tape cassette 1 were reversed such that take-up reel 1c were leading, magnetic tape 2 wrapped on supply reel 1b, then trailing, would block the passage of light from light source 17a to phototransistor 17b. A signal from phototransistor 17b indicating the presence or absence thereon of light from light source 17a, is applied to a discriminating circuit 18. An output from discriminating circuit 18 is also applied to discriminating circuit 11.

A position determining circuit may consist of a light source 19a and a photo-electric conversion device, such as a phototransistor 19b, and detects the position of tape cassette 1 at which sensing will be performed. As best seen in FIG. 5, when tape cassette 1 reaches the dashed line joining light source 19a and phototransistor 19b, phototransistor 19b generates a signal which is applied to a control circuit 14 (FIG. 4). Control circuit 14 generates a signal which energizes strobe lamp 20 to produce a brief flash of light and enables binary value circuit 8, picture memory 9, code-read-out circuit 10 and discrimination circuit 11 to accept and process digital data. At the same time, phototransistor 17b produces an output signal which is dependent upon whether supply reel 1b is leading or lagging in the transport direction on conveyor belt 6 and applies a signal in response thereto to discrimination circuit 18. As would be clear to one skilled in the art, when the A-surface label 3 is sensed, the correct response from phototransistor 17b is an indication that light is received. When the B-surface label is sensed, the correct response from phototransistor 17b indicates the absence of light. When the digital data on label 3 agrees with the digital data on tape leader 2a, and when the sensed tape surface indication (surface A or surface B) on label 3 agrees with the leading or lagging position of supply reel 1b as sensed by inspection device 17, tape cassette 1 is determined to be properly labeled and continues on conveyor belt 6 for such subsequent operations as packing and shipment.

When the tape description on label 3 and tape leader 2a disagree, discrimination circuit 11 applies a signal to control circuit 14, which in turn, applies a signal to a drive circuit 15 which thereupon controls a cassette removing mechanism 16, of any convenient type, for removing tape cassette 1 from conveyor belt 6 to prevent it being placed on the market. Similarly, when the tape surface (A or B), as indicated on label 3, and the leading or lagging position of supply reel 1b, as determined by inspection device 17, disagree, discrimination circuit 11, control circuit 14, and drive circuit 15 also cooperate to permit cassette removing mechanism 16 to remove the incorrectly labeled tape cassette from conveyor belt 6.

Although coded bars 5 on tape leader 2a and coded bars 4a and 4b on arrow 4 are shown as black and white bars, other types of coding such as, for example, color coding, could be used without departing from the spirit of the present invention. If color coding is used, television cameras 7 and 12 may be replaced with a color discrimination device which produces different voltages in correspondence to the wavelengths of the colors used.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A tape cassette having a magnetic tape loaded therein and having a label on the outer surface of said tape cassette, comprising:
   first sensible means on said label for indicating at least one physical characteristic of a magnetic tape;
   second sensible means on said magnetic tape and not visually associated with said first sensible means for indicating said at least one characteristic of said magnetic tape; and wherein said at least one characteristic indicated on said label is adapted to be compared with said at least one characteristic indicated on said magnetic tape to determine whether said first sensible means on said label correctly indicates said at least one characteristic of said magnetic tape.

2. A tape cassette according to claim 1; wherein said label includes a symbol indicating a tape transport direction.

3. A tape cassette according to claim 1; wherein said first sensible means is a digitally coded region on said label.

4. A tape cassette according to claim 1; wherein said magnetic tape includes a tape leader and said second sensible means includes a set of digitally coded marks on said tape leader.

5. A tape cassette according to claim 4; wherein said first sensible means includes a digitally coded region on said label containing a second set of digitally coded marks.

6. A tape cassette label inspection system for use with a tape cassette having a housing with a label thereon and a magnetic tape loaded therein and sensible markings on said label and on said magnetic tape indicating at least one characteristic of said magnetic tape, comprising:
first means for sensing said sensible markings on said magnetic tape and for producing a first signal in dependence thereon;
second means for sensing said sensible markings on said label and for producing a second signal in dependence thereon; and
means for comparing said first and second signals to determine whether agreement exists between said sensible markings on said label and on said magnetic tape.

7. A system according to claim 6; wherein said tape cassette further includes a supply reel within said housing and having said magnetic tape wound thereon, said housing has first and second surfaces, said supply reel has a predetermined positional relationship to said first and second surfaces, and said at least one characteristic on said label sensed by said second means includes one of said first and second surfaces; and further comprising third means for sensing said predetermined positional relationship, said means for comparing including means for comparing said predetermined positional relationship sensed by said third means with said one of said first and second surfaces sensed by said second means.

8. A system according to claim 7; further comprising:
means for conveying said tape cassette past said first and second means for sensing; and
means actuated by said means for comparing for removing said tape cassette from said means for conveying when said agreement is determined not to exist.

9. A system according to claim 6; further comprising:
means for conveying said tape cassette past said first and second means for sensing; and
means actuated by said means for comparing for removing said tape cassette from said means for conveying when said agreement is determined not to exist.

10. A system according to claim 6; wherein said sensible markings include digitally coded markings.

11. A system according to claim 6; wherein said first and second means for sensing include first and second television cameras, respectively.

12. A system according to claim 11; further comprising:
means for conveying said tape cassette past said first and second means for sensing;
third means for sensing when said tape cassette attains a predetermined position;
a lamp for illuminating said sensible markings; and
means responsive to said third means for energizing said lamp and means for comparing.

13. A system according to claim 6; wherein said label further contains means for indicating a forward tape transport direction and said sensible markings on said label are included in said means for indicating said forward tape transport direction.

14. An apparatus comprising:
a tape cassette having a label and a magnetic tape loaded therein;
first sensible markings on said label indicating at least one characteristic of a magnetic tape;
second sensible markings on said magnetic tape indicating at least one characteristic of said magnetic tape;
first means for sensing said first sensible markings;
second means for sensing said second sensible markings; and
means responsive to said first and second means for determining agreement in said at least one characteristic between said label and said magnetic tape.

15. An apparatus according to claim 14; wherein said tape cassette includes a supply reel, said magnetic tape is wound on said supply reel, said tape cassette has first and second surfaces, at least one of said first and second surfaces has said label thereon, and said label further identifies one of said first and second surfaces; and further including means for conveying said tape cassette in a conveying direction past said first and second means, third means for sensing a location of said supply reel with respect to said conveying direction, and means for detecting that said location is correct for said one of said first and second surfaces.

16. An apparatus according to claim 15; further comprising means for removing said tape cassette from said means for conveying in response to at least one of lack of said agreement and an incorrect location of said supply reel.

* * * * *